UNITED STATES PATENT OFFICE.

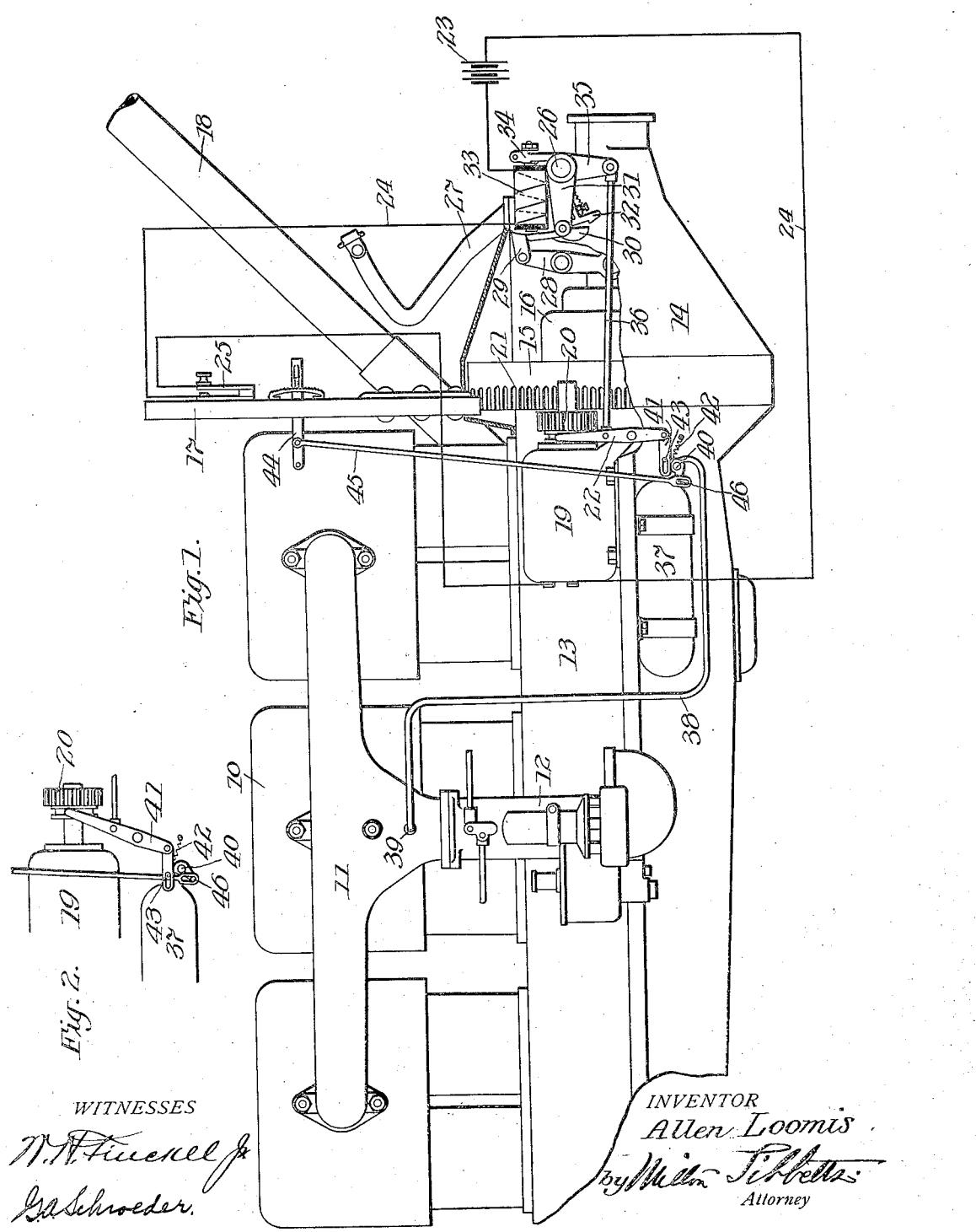

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

STARTING MECHANISM FOR INTERNAL-COMBUSTION ENGINES.

1,139,783. Specification of Letters Patent. Patented May 18, 1915.

Application filed April 25, 1912. Serial No. 693,059.

*To all whom it may concern:*

Be it known that I, ALLEN LOOMIS, a citizen of the United States, and resident of Detroit, Wayne county, State of Michigan, have invented certain new and useful Improvements in Starting Mechanism for Internal-Combustion Engines, of which the following is a specification.

This invention relates to motor vehicles and particularly to the mechanism and its associated parts for cranking the internal combustion engines of such vehicles.

Electric motors operated by storage batteries have been used for the purpose of "cranking" internal combustion engines and thereby starting them on their cycle of operation. It has been found, particularly in the use of such devices with motors for motor vehicles, that when a comparatively small electric motor and batteries of small capacity are used, the internal combustion engine can be cranked only very slowly and it has been found to be difficult under these conditions to start such engines, particularly in cold weather, partly because of the low grade of gasolene that it is necessary to use. The gasolene is not sufficiently volatile to form an explosive charge with the low suction afforded by the slowly moving pistons. It is proposed by the present invention to overcome this difficulty by adding to the electric starting motor equipment an explosive gas supply with suitable connections whereby the various devices may be simultaneously operated for the purpose of producing more satisfactory results. The present invention therefore involves the use of a tank of gas, such as acetylene gas, and connections from the tank to the intake manifold of the internal combustion motor, a valve in these connections, and a connection from the valve to the operated parts of an electric starting motor system so that acetylene gas will be automatically supplied to the engine as it is cranked by the electric motor. Provision is made for disconnecting or rendering inoperative the gas supply part of the combination if it is found the motor will start readily without such gas, as in warm weather or with a higher grade of gasolene.

Other objects and advantages will appear in the detail description following.

In the drawings, Figure 1 is a side elevation of an internal combustion engine and its associated parts as arranged on a motor vehicle; and Fig. 2 is a view of a detail.

10 represents an internal combustion engine, 11 is the intake header thereof and 12 is the carbureter. The crank case 13 has a rearward extension 14 in which the fly wheel 15 and clutch 16 are housed. The engine is mounted in a vehicle, the dash 17 and the steering post 18 of which are shown in the drawings. The engine is equipped with a cranking device in the form of an electric motor 19 of any approved construction, and this electric motor is provided with a sliding gear 20 which is adapted to mesh with the teeth 21 on the fly wheel 15 of the engine. In Fig. 1 the gear 20 is shown as disengaged from the fly wheel and it may be moved into engagement therewith by the lever 22 as will be hereinafter more fully described.

The electric motor 19 is energized from a storage battery 23 through the circuit 24 which is controlled by a hand switch 25, preferably mounted on the dash 17 or in convenient reach of the operator. Mounted on a cross shaft 26 on the motor vehicle is a clutch pedal lever 27 which is adapted to operate the clutch 16 through the lever 28 and link 29 in the usual manner. Adapted to oscillate with the lever 27 is an arm 30, and an arm 31 is mounted on the shaft 26 adjacent the arm 30 but is adapted to remain stationary except when it is coupled to the arm 30 by a dog 32 pivoted to the arm 31 and controlled by a magnet 33 which is energized when the circuit 24 is closed by the switch 25. The magnet 33 is mounted on a bracket 34 secured to the arm 31 so that it moves with it, and the arm 31 has another arm 35 moving with it and connected by a link 36 with the lever 22 referred to above.

From the above description it will be seen that the engine may be started by closing the switch 25 which thereby starts the motor 19 and couples the arm 31 to the arm 30, and throwing the clutch 16 out with the pedal lever 27 which carries with it the arms 31 and 35 whereby the gear 20 is moved into engagement with the fly wheel 21. As soon as the engine starts the clutch is released and the gear 20 is thrown out of engagement with the fly wheel and the motor 19 stops upon opening the switch 25.

As suggested above the motor 19 turns the fly wheel 15 comparatively slowly so that under ordinary circumstances difficulty is experienced in getting a combustible mixture from the carbureter 12. In the present invention this is overcome by automatically supplying a combustible gas to the motor as it is cranked.

A tank 37 is conveniently mounted on the motor or some part of the vehicle and a pipe 38 leads from the tank to some part of the engine where it may reach the cylinders, and in the present instance it is shown as leading to the intake manifold 11 as at 39. A valve 40 having two closed positions and a single open position between them is adapted to be operated by the lever 22 through a link 41. The valve 40 is held in one of its closed positions by a spring 42 and the link 41 is connected to the valve by a pin and slot connection 43. By this arrangement the valve 40 may be opened by a hand lever 44 arranged for convenient operation by the driver, the connection with the valve 40 being made through a link 45 which also has a pin and slot connection 46 with the valve 40 so that the valve may be moved to open position by the lever 22 without interference from the hand lever 44. This hand control for the valve 40 is for the purpose of supplying a combustible gas to the engine as it is stopped, which of course it is desirable to do independently of the starting motor 19. By thus filling the engine cylinders with gas as it is stopped, starting is greatly facilitated, the engine frequently starting " on the spark " and without the use of the starting motor 19.

It is sometimes found that in very warm weather or with a very high grade of gasolene, it is not necessary to supply gas to the motor for starting and under these conditions it is advisable to render inoperative the connection to the gas valve 40. In the present invention this may be accomplished by moving the valve 40 to its second closed position shown at 47 in Fig. 2 whereby the valve is not operated by the lever 22 as it moves the gear 20 into engagement with the fly wheel.

It will be understood that the tank 37 contains combustible gas, such as acetylene gas.

Various modifications of the devices and the connections may be made without departing from the invention, the scope of which is set forth in the claims following.

Having thus described my invention what I claim is:

1. The combination with an internal combustion engine, of an electric motor, sliding connections for gearing said motor to said engine, a storage battery and connections and switches in circuit with said motor for operating the latter, a gas supply and valve for injecting an explosive gas into the intake manifold of said engine, means for operating the sliding connection of said motor, and connections from said means to said valve for operating the latter.

2. The combination with an internal combustion engine, of an electric motor adapted to be connected thereto for cranking the engine, a storage battery and connections for operating said motor, a switch to control the battery circuit, a gas tank and connections for supplying an explosive gas to said engine, a valve in said tank connections, a manually operable device, and means whereby said device is adapted to actuate said valve only when said electric motor is connected to said engine for cranking the latter.

3. The combination with an internal combustion engine, of an electric motor adapted to be connected thereto for cranking the engine, a storage battery and connections for operating said motor, a switch to control the battery circuit, a gas tank and connections for supplying an explosive gas to said engine, a valve in said tank connections, a manually operable device, means whereby said device is adapted to actuate said valve only when said electric motor is connected to said engine for cranking the latter, and manually controlled means for independently actuating said valve.

4. The combination with an internal combustion engine, of means for cranking said engine including an auxiliary motor, a gas tank and connections for supplying an explosive gas to said engine, a valve in said tank connections, a manually operable device, connections between said device and said auxiliary motor and said valve for controlling them, and a hand lever for independently operating said valve to open it and for positioning it so that it is inoperative with the auxiliary motor.

5. The combination with an internal combustion engine, of an electric motor adapted to be connected thereto for cranking the engine, a storage battery and connections for operating said motor, a switch to control the battery circuit, a gas tank and connections for supplying an explosive gas to said engine, a valve in said tank connections, a device under the control of the operator, means whereby said device is adapted to actuate said valve when said electric motor is connected to said engine for cranking the latter, and means under the control of the operator for independently actuating said valve.

In testimony whereof I affix my signature in the presence of two witnesses.

ALLEN LOOMIS.

Witnesses:
W. H. FINCKEL, Jr.,
G. A. SCHROEDER.